United States Patent [19]

Olson

[11] Patent Number: 4,556,606
[45] Date of Patent: Dec. 3, 1985

[54] UV-STABILIZED COATED POLYESTER-CARBONATE ARTICLES AND PROCESS

[75] Inventor: Daniel R. Olson, Schenectady, N.Y.

[73] Assignee: General Electric Company, Pittsfield, Mass.

[21] Appl. No.: 566,979

[22] Filed: Dec. 30, 1983

[51] Int. Cl.$^4$ ............ B32B 9/04; B32B 13/12; B05D 3/02
[52] U.S. Cl. .................. 428/412; 427/387; 427/393.5; 427/407.1; 428/451
[58] Field of Search ............ 428/412, 451; 427/407.1, 393.5, 387

[56] References Cited

U.S. PATENT DOCUMENTS

| | | | |
|---|---|---|---|
| 2,999,835 | 9/1961 | Goldberg | 260/42 |
| 3,028,365 | 4/1962 | Schnell et al. | 528/199 |
| 3,030,331 | 4/1962 | Goldberg | 260/42 |
| 3,038,365 | 6/1962 | Peterson | 84/1.26 |
| 3,153,008 | 10/1964 | Fox | 260/47 |
| 3,169,121 | 2/1965 | Goldberg | 260/47 |
| 3,214,436 | 10/1965 | Boyle et al. | 260/308 |
| 3,299,172 | 1/1967 | Schade et al. | 260/860 |
| 3,309,220 | 3/1967 | Osteen et al. | 427/430.1 |
| 3,322,719 | 5/1967 | Pielstocker | 260/45.8 |
| 3,594,264 | 7/1971 | Urban | 428/412 |
| 4,191,290 | 3/1980 | Chung et al. | 427/164 |
| 4,284,685 | 8/1981 | Olson et al. | 428/331 |
| 4,349,602 | 9/1982 | Ching | 428/412 X |
| 4,353,959 | 10/1982 | Olson et al. | 428/412 X |
| 4,371,585 | 2/1983 | Memon | 428/412 |
| 4,382,109 | 5/1983 | Olson et al. | 428/331 |
| 4,396,678 | 8/1983 | Olson | 428/412 |
| 4,439,494 | 3/1984 | Olson | 428/412 |
| 4,478,876 | 10/1984 | Chung | 427/54.1 |

OTHER PUBLICATIONS

Carlsson, D. J. and D. M. Wiles, "The Photo Degradation and Photostabilization of Polymers a Review" Journal of Radiation Curing, vol. 2 (4), Oct. 1975, pp. 2–14.

Gantz, G. M. & S. M. Roberts, "Ultraviolet Absorbers" Encyclopedia of Chemical Technology, Kirk and Othmer Ed., 2nd Supplement, Stander Ed., pp. 883–902, 1960.

Weicksel, J. A.; "Ultra-Violet Absorbers" Modern Plastics, vol. 41, No. 1A, pp. 401–405, Sep. 1963.

*Primary Examiner*—Thurman K. Page
*Attorney, Agent, or Firm*—Edward K. Welch, II; William F. Mufatti; Francis T. Coppa

[57] ABSTRACT

UV-stabilized coated polyester-carbonate articles may be prepared by adding to the coating compositions an effective amount of a benzophenone and/or benzotriazole UV absorber.

22 Claims, No Drawings

UV-STABILIZED COATED POLYESTER-CARBONATE ARTICLES AND PROCESS

CROSS REFERENCE TO RELATED APPLICATION

Reference is made to copending application Ser. No. 566,978, filed Dec. 30, 1983, for Daniel R. Olson, for Surface-Stabilized Polyester-Carbonate Articles and Process, which patent application is assigned to the instant assignee.

This invention relates to UV-stabilized polyester-carbonate articles and the process by which they may be prepared. Specifically, UV-stabilized articles are prepared by coating copolyester-carbonate articles with suitable coating compositions containing effective amounts of benzophenone and/or benzotriazole UV absorbers. These articles may be further modified to improve adhesions of the surface coating by first applying an interlayer or primer to the surface of the polyester-carbonate article prior to coating with the UV stabilizer coating.

BACKGROUND

Polyester-carbonate resins are especially desirable for use in producing molded and extruded articles, particulaly, for glazing and transparent sheet applications demanding high impact resistance, high resistance to scratching, and/or high solvent resistance. They exhibit melt processability, high tensile strength, high impact strength and good clarity and freedom from color; approximating like qualities in commercial polycarbonates. Further, they are for some uses even more desirable than polycarbonates due to their higher heat distortion temperature. However, the usefulness of polyester-carbonates is limited by their high susceptibility to yellowing during exposure to light, especially sunlight.

During accelerated light aging studies, unstabilized polyester-carbonate is noticeably yellow (change in yellowness index of about 5) after less than 5 hours of exposure to RS sunlamps. By way of comparison, BPA-polycarbonate, which is considered to prone to photo-yellowing, must be exposed to RS sunlamps for about 100 hours to become noticeably yellow.

It is, therefore, an object of this invention to provide polyester-carbonate articles and a method of producing such articles which are highly resistant to ultraviolet light degradation.

The use of ultraviolet radiation absorbers with various resins such as polyesters, polyolefins, vinyls, polycarbonates and polystyrene to provide protection against attack by ultraviolet radiation is known in the art. The ultraviolet radiation absorber functions by reason of its ability to screen out the damaging ultraviolet portion of light due to its very high absorptivity relative to that of the polymer. In order to qualify as a successful ultraviolet light absorber for a polymer, particularly for polyester-carbonate, there are several requirements which the absorber must fulfill. The absorber must have a high specific absorptivity in the range of wave lengths that are most deleterious to the polymer and that are present in the source of the exposure. The absorber must be compatible with the polymer and/or coating composition and must not degrade either the polymer or coating composition so as to cause a loss of properties and increase in color. The absorber must not significantly absorb in the visible region of the spectrum or a color will be imparted to the polymer to which it has been added. The absorber must also have a sufficiently low volatility to permit its continued residence in the polymer.

Additionally, because the UV absorber is applied to the polyester-carbonate article in a coating composition, it is important that the coating composition is durably and tenaciously adhered to the surface of the article and is compatible therewith so as not to adversely affect the underlying polyester-carbonate as by stress cracking or crazing, by causing crack propagations and/or adversely effecting the properties of the polyester-carbonate generally, as for example impact resistance, elongation and tensile strength.

SUMMARY

It has now been found that polyester-carbonate articles having improved weatherability, particularly with respect to retardation of photo-yellowing upon exposure to light, may be obtained by surface coating copolyester-carbonate articles with suitable coating compositions containing effective amounts of either benzophenone or benzotriazole UV absorbers. Suitable coating compositions are any known in the art which meet the standards set forth above and include those which are known to improve scratch resistance, mar resistance and resistance to solvent degradation.

Additionally, the articles of the present invention may be further modified to improve adhesion of the UV stabilizer coating composition by first applying an interlayer or primer to the surface of the polyester-carbonate articles.

DETAILED DESCRIPTION OF THE INVENTION

Copolyester-carbonates encompassed within the full scope of the invention include any of those known in the art. Generally, they are prepared by the reaction of a carbonyl halide with a difunctional carboxylic acid and an excess of a molar equivalent, in comparison with the carboxylic acid, of a dihydroxy compound selected from the group consisting of dihydric phenol and glycols.

The copolyester-carbonates generally comprise at least two of the following four recurring units in the chain:

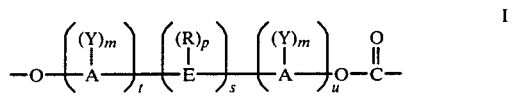

I

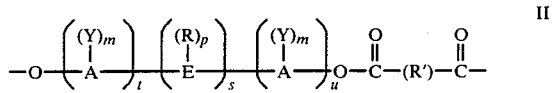

II

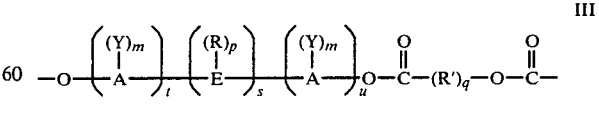

III and

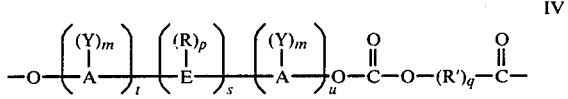

IV wherein R is a monovalent hydrocarbon radical, for example, alkyl radicals (e.g., methyl, ethyl, propyl, isopropyl, butyl etc.), aryl radicals (e.g., phenyl, naphthyl, biphenyl, tolyl, etc.), aralkyl radicals (e.g., benzyl, ethylphenyl, etc.), cycloaliphatic radicals (e.g., cyclopentyl, cyclohexyl, etc.) as well as monovalent hydrocarbon radicals containing inert substituents thereon, such as halogen (chlorine, bromine, fluorine, etc.). It being understood that where more than one R is used, they may be alike or different, E can be selected from the group consisting of alkylene and alkylidene residues such as methylene, ethylene, propylene, propylidene, isopropylidene, butylene, butylidene, isobutylidene, etc.; or an ether radical; a sulfur-containing radical such as sulfide, sulfoxide or sulfone; a carbonyl radical; a tertiary nitrogen radical or a silicon-containing radical such as silane or siloxane. E can also consist of two or more alkylene or alkylidene groups, such as above, separated by the residue of an aromatic nucleus, a tertiary amino radical, an ether radical, a carbonyl radical, a silane radical, or by a sulfur-containing radical such as sulfide, sulfoxide, sulfone, etc. Other groupings which can be represented by E will occur to those skilled in the art. A is the residue of an aromatic nucleus, Y is a substituent selected from the group consisting of (a) inorganic atoms, (b) inorganic radicals, and (c) organic radicals; (a), (b) and (c) being inert to and unaffected by the reactant and by the reaction conditions, m is a whole number including zero to a maximum equivalent to the number of replaceable nuclear hydrogens substituted on the aromatic hydrocarbon residue, p is a whole number including zero to a maximum determined by the number of replaceable hydrogens on E, s ranges from 0–1, t and u are whole numbers including 0. When s is 0, however, either t or u may be 0 and not both. R' is an alkylene, alkylidene or cycloaliphatic group in the same manner as set out above for R; an alkylene, alkylidene or cycloaliphatic group containing ethylenic unsaturation; an aromatic radical such as phenylene, naphthalene, biphenylene, substituted phenylene, etc.; two or more aromatic groups connected through non-aromatic linkages such as those defined by E; or an alkyl radical such as tolylene, xylylene, etc., and q is 0 or 1.

Suitable copolyester-carbonates and processes for the production thereof are disclosed in U.S. Pat. Nos. 3,030,331; 3,169,121; 3,207,814; 4,156,069; 4,238,596; 4,286,083 and 4,369,303 all incorporated herein by reference.

In accordance with the present invention, articles comprised of polyester-carbonate resin may be formed in any conventional manner, for example by injection molding. Other methods, such as extrusion, cold forming, vacuum forming, blow molding, compression molding, transfer molding and the like, which will be obvious to those skilled in the art, may be used to form the article. The article itself may be in any shape and need not be a finished article of commerce; that is, it could be sheet material which would be cut or mechanically shaped into a finished article. Therefore, as used herein, it will be understood that the term "article" refers to any shape of polyester-carbonate resin whether finished or stock material.

The ultraviolet radiation absorbers employed in the practice of this invention include benzophenone and benzophenone derivatives and benzotriazole and benzotriazole derivatives. These compounds function by reason of their ability to screen out the damaging ultraviolet portion of the light due to their very high absorptivity in the ultraviolet region of the spectrum. Other known UV absorbing compounds including benzoate esters, phenylsalicylates, derivatives of crotonic acid, malonic acid esters and cyanoacrylate are found not to be useful for copolyester-carbonates.

Included among the ultraviolet radiation absorbers which fall into the categories of benzophenone derivatives and benzotriazole derivatives are those compounds disclosed in U.S. Pat. Nos. 3,309,220; 3,049,443; 3,043,709; 3,214,436; and 2,976,259 and U.S. Pat. No. Re. 2,976, all of which are incorporated herein by reference. Some non-limiting examples of these compounds include:

2,2'-dihydroxybenzophenone;
2,2',4,4'-tetrahydroxybenzophenone;
2,2'-dihydroxy-4,4'-dimethoxybenzophenone;
2,2'-dihydroxy-4,4'-diethoxybenzophenone;
2,2'-dihydroxy-4,4'-dipropoxybenzophenone;
2,2'-dihydroxy-4,4'-dibutoxybenzophenone;
2,2'-dihydroxy-4-methoxy-4'-ethoxybenzophenone;
2,2'-dihydroxy-4-methoxy-4'-propoxybenzophenone;
2,2'-dihydroxy-4-methoxy-4'-butoxybenzophenone;
2,2'-dihydroxy-4-ethoxy-4'-propoxybenzophenone;
2,2'-dihydroxy-4-ethoxy-4'-butoxybenzophenone;
2,3'-dihydroxy-4,4'-dimethoxybenzophenone;
2,3'-dihydroxy-4-methoxy-4'-butoxybenzophenone;
2-hydroxy-4,4',5'-trimethoxybenzophenone;
2-hydroxy-4,4',6'-tributoxybenzophenone;
2-hydroxy-4-butoxy-4',5'-dimethoxybenzophenone;
2-hydroxy-4-ethoxy-2',4'-dibutylbenzophenone;
2-hydroxy-4-propoxy-4',6'-dichlorobenzophenone;
2-hydroxy-4-propoxy-4',6'-dibromobenzophenone;
2,4-dihydroxybenzophenone;
2-hydroxy-4-methoxybenzophenone;
2-hydroxy-4-ethoxybenzophenone;
2-hydroxy-4-propoxybenzophenone;
2-hydroxy-4-butoxybenzophenone;
2-hydroxy-4-methoxy-4'-methylbenzophenone;
2-hydroxy-4-methoxy-4'-ethylbenzophenone;
2-hydroxy-4-methoxy-4'-propylbenzophenone;
2-hydroxy-4-methoxy-4'-butylbenzophenone;
2-hydroxy-4-methoxy-4'-tertiarybutylbenzophenone;
2-hydroxy-4-methoxy-4'-chlorobenzophenone;
2-hydroxy-4-methoxy-2'-chlorobenzophenone;
2-hydroxy-4-methoxy-4'-bromobenzophenone;
2-hydroxy-4-,4'-dimethoxybenzophenone;
2-hydroxy-4,4'-dimethoxy-3-methylbenzophenone;
2-hydroxy-4,4'-dimethoxy-2'-ethylbenzophenone;
2-hydroxy-4,4',5'-trimethoxybenzophenone;
2-hydroxy-4-ethoxy-4'-methylbenzophenone;
2-hydroxy-4-ethoxy-4'-ethylbenzophenone;
2-hydroxy-4-ethoxy-4'-propylbenzophenone;
2-hydroxy-4-ethoxy-4'-butylbenzophenone;
2-hydroxy-4-ethoxy-4'-methoxybenzophenone;
2-hydroxy-4,4'-diethoxybenzophenone;
2-hydroxy-4-ethoxy-4'-propoxybenzophenone;
2-hydroxy-4-ethoxy-4'-butoxybenzophenone;
2-hydroxy-4-ethoxy-4'-chlorobenzophenone;
2-hydroxy-4-ethoxy-4'-bromobenzophenone;
2-(2'-hydroxy-5'-methylphenyl)-benzotriazole;
2-(2'-hydroxy-5'-tert-butylphenyl)-benzotriazole;
2-(2'-hydroxy-3'-methyl-5'-tert-butylphenyl)-benzotriazole;
2-(2'-hydroxy-5'-cyclohexylphenyl)-benzotriazole;
2-(2'-hydroxy-3',5'-dimethylphenyl)-benzotriazole;
2-(2'-hydroxy-5'-tert-butylphenyl)-5-chlorobenzotriazole; and
2-(2'-hydroxy-3'-di-tert-butylphenyl-benzotriazole.

The amount of ultraviolet radiation absorbing compound present in the coating composition is an effective amount to protect the underlying polyester-carbonate resin against degradation by ultraviolet radiation. Essentially, an effective amount of ultraviolet radiation absorbing compound is that amount wherein the absorbance of the ultraviolet radiation absorbing compound at λmaximum is at least 1, which corresponds to absorption at λmaximum of at least 90% of the incident ultraviolet radiation by the UV stabilizer coating composition. The absorbance is calculated using the relationship $A = \log (I_o/I)$ wherein A is the absorbance, $I_o$ is the intensity of incident light, and I is the intensity of transmitted light.

More specifically, but not by limitation, the stabilizing coating solution compositions (ie. coating material, UV stabilizer, other additives, if any, and solvent) contain from about 0.01 to about 20 weight percent of an ultraviolet radiation absorbing compound, preferably from about 1.0 to about 15 weight percent of an ultraviolet radiation absorber, and more preferably from about 5 to about 13 weight percent of an ultraviolet radiation absorber. Further, the stabilizing coating solution compositions may contain only one ultraviolet radiation absorber or a combination of two or more ultraviolet radiation absorbers. If two or more ultraviolet radiation absorbing compounds are present in the stabilizing coating compositions their combined weight percentages generally range from about 0.01 to about 20 weight percent of the stabilizing coating solution composition. Obviously, stabilizing compositions having higher concentrations of UV absorber than stated above are useful in the practice of the present invention and are within the full intended scope of the invention as disclosed herein.

The ultraviolet radiation absorbing compounds may be incorporated into any coating composition suitable for coating copolyester-carbonate resin and articles produced therefrom. Preferred coating materials include the thermoplastic acrylics and the thermosetting acrylics, with the most preferred coating composition being polymethylmethacrylate and copolymers thereof.

The thermoplastic acrylic polymers which are employed herein are well known in the art. Exemplary thermoplastic acrylic polymers are set forth, for example, in *Encyclopedia of Polymer Science and Technology*, Vol. 1, Interscience Publishers, John Wiley and Sons, Inc., 1964 at page 246 et. seq., and the references cited therein, all of which are hereby incorporated by reference.

The term "thermoplastic acrylic polymers" as used herein is meant to embrace within its scope those thermoplastic polymers resulting from the polymerization of one or more acrylic acid ester monomers as well as methacrylic acid ester monomers. These monomers are represented by the general formula

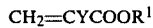
$$CH_2=CYCOOR^1 \qquad V$$

wherein Y is hydrogen or a methyl radical and $R^1$ is an alkyl radical preferably an alkyl radical containing from 1 to about 20 carbon atoms.

Some nonlimiting examples of alkyl groups represented by $R^1$ include methyl, ethyl, n-propyl, isopropyl, n-butyl, isobutyl, sec-butyl, tert-butyl, pentyl, isopentyl, hexyl, and the like.

Some nonlimiting examples of acrylic acid ester monomers represented by formula V include methyl acrylate, isopropyl acrylate, n-propyl acrylate, n-butyl acrylate, isobutyl acrylate, and 2-ethylhexyl acrylate. Some nonlimiting examples of methacrylic acid ester monomers represented by formula V include methyl methacrylate, ethyl methacrylate, butyl methacrylate, hexyl methacrylate, isobutyl methacrylate, and propyl methacrylate. Copolymers of the above acrylate and methacrylate monomers are also included within the term thermoplastic acrylic polymers as it appears herein. The polymerization of the monomeric acrylic acid esters and methacrylic acid esters to provide the thermoplastic acrylic polymers useful in the practice of this invention may be accomplished by any of the well known polymerization techniques. The thermoplastic acrylic polymers having a molecular weight of at leaast about 15,000 are generally preferred in the practice of the instant invention.

The thermoplastic acrylic polymers useful as coatings include acrylic homopolymers derived from a single type of acrylic acid ester monomer; methacrylic homopolymers derived from a single type of methacrylic acid ester monomer and copolymers derived from two or more different acrylic acid ester monomers, two or more different methacrylic acid ester monomers, or an acrylic acid ester monomer and a methacrylic acid ester monomer.

Mixtures of two or more of the aforedescribed thermoplastic acrylic polymers, e.g., two or more different acrylic homopolymers, two or more different acrylic copolymers, two or more different methacrylic homopolymers, two or more different methacrylic copolymers, an acrylic homopolymer and a methacrylic homopolymer, an acrylic copolymer and a methacrylic copolymer, an acrylic homopolymer and a methacrylic copolymer, and an acrylic copolymer and a methacrylic homopolymer, can also be used.

Suitable thermoplastic coatings also include thermoplastic acrylic polymers containing functional groups. See e.g. U.S. Pat. Nos. 3,968,305 and 3,968,309, incorporated herein by reference.

The term "thermoplastic acrylic polymer containing functional groups" as used herein is meant to embrace within its scope those thermoplastic polymers resulting from the polymerization of one or more substituted acrylic or methacrylic acid ester monomers represented by the general formula

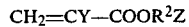
$$CH_2=CY-COOR^2Z \qquad VI$$

wherein Y is hydrogen or a methyl radical; $R^2$ is a divalent saturated aliphatic hydrocarbon radical; and Z is a hydroxyl, carboxyl, amine, epoxide, amide, SH, $SO_3H$, $COOR^3$, or $Si(OR^4)_3$ group, wherein $R^3$ and $R^4$ are alkyl groups, preferably alkyl groups containing from 1 to about 20 carbon atoms. $R^2$ is preferably a divalent saturated aliphatic hydrocarbon radical containing from 1 to about 20 carbon atoms. Copolymers resulting from the copolymerization of two substituted acrylic or methacrylic acid ester monomers are also included within the term thermoplastic arcylic polymer containing functional groups. Also included within this term are copolymers resulting from the copolymerization of acrylic acid ester monomers and/or methacrylic acid ester monomers represented by the general formula

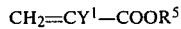
$$CH_2=CY^1-COOR^5 \qquad VII$$

wherein $Y^1$ is hydrogen or a methyl radical and $R^5$ is an alkyl radical with the substituted acrylic acid ester or substituted methacrylic acid ester monomers of formula VI. Some nonlimiting examples of acrylic acid ester or methacrylic acid ester monomers of formula VII which can be copolymerized with the substituted acrylic or methacrylic acid ester monomers of formula VI to form the thermoplastic acrylic polymers containing functional groups include methyl acrylate, ethyl acrylate, butyl acrylate, 2-ethylhexylacrylate, methyl methacrylate, ethyl methacrylate, butyl methacrylate, hexyl methacrylate, and the like. Examples of copolymers of this type include copolymers obtained by the copolymerization of ethyl methacrylate and hydroxyethyl methacrylate, ethyl methacrylate and gamma-methacryloxypropyltrimethoxysilane, methyl acrylate and hydroxyethyl acrylate, and the like.

The polymerization of these substituted and unsubstituted acrylate and methacrylate monomers to provide the thermoplastic acrylic polymer containing functional groups useful in the practice of the present invention may be accomplished by any of the well known polymerization techniques.

Some nonlimiting examples of typical substituted acrylic and methacrylic acid ester monomers represented by formula VI include:

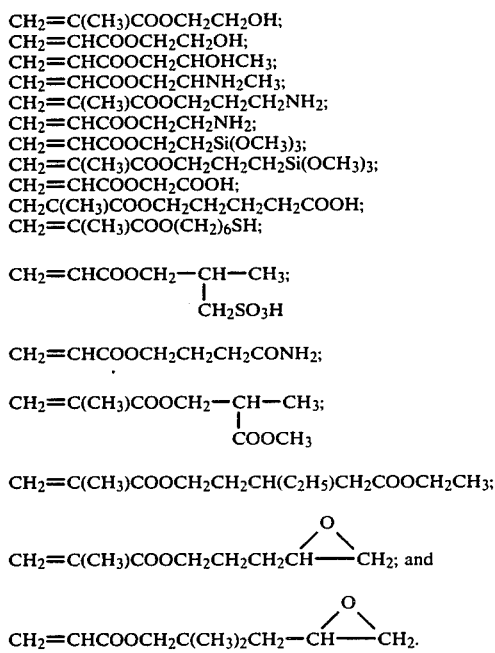

The term thermoplastic acrylic polymer containing functional groups thus includes homopolymers obtained from the polymerization of a substituted acrylic or methacrylic acid ester monomer; copolymers obtained from the copolymerization of two substituted acrylic acid ester monomers; copolymers obtained from the copolymerization of two substituted methacrylic acid ester monomers; copolymers obtained from the copolymerization of a substituted acrylic acid ester monomer and a substituted methacrylic acid ester monomer; copolymers obtained by the copolymerization of a substituted acrylic acid ester monomer and a methacrylic acid ester monomer; copolymers obtained by the copolymerization of a substituted acrylic acid ester monomer and an acrylic acid ester monomer; copolymers obtained by the copolymerization of a substituted methacrylic acid ester monomer and an acrylic acid ester monomer; and copolymers obtained by the copolymerization of a substituted methacrylic acid ester monomer and a methacrylic acid ester monomer.

Mixtures of two or more of these homopolymers or copolymers can also be used in the practice of the present invention.

Generally, it is preferred that the thermoplastic acrylic polymers containing functional groups have an average molecular weight of at least about 20,000 and preferably at least about 50,000.

Exemplary, nonlimiting, thermosettable acrylics which may be employed in the practice of this invention are disclosed, for example, in *Encyclopedia of Polymer Science and Technology*, Vol. 1, Interscience Publishers, John Wiley & Sons, Inc., 1964, at page 273 et seq., and in *Chemistry of Organic Film Formers*, by D. H. Solomon, John Wiley and Sons, Inc., 1967, at page 251 et seq., and the references cited therein, all of which are incorporated herein by reference.

These thermosettable acrylic polymers generally include: (I) acrylic copolymers having reactive functional groups which are capable of reacting between themselves to effect a cross-linkage thereof; (II) acrylic copolymers having reactive functional groups to which there is added an appropriate cross-linking agent which will react with the functional groups to effect cross-linking; and (III) a mixture of two polymers having cross-linkable functional reactive groups.

Typically, the reactions involved in cross-linking the thermosettable acrylic polymers are reactions between, for example: epoxide functional groups and amine functional groups; epoxide functional groups and acid anhydride functional groups; epoxide functional groups and carboxyl functional groups, including phenolic hydroxyl groups; expoxide functional groups and N-methylol or N-methylol-ether functional groups; carboxyl functional groups and N-methylol or N-methylol-ether functional groups; interraction between carboxyl and isocyanate groups; reactions between hydroxyl, for example polyols, and isocyanate groups; and reactions between amine groups and N-methylol or N-methylol-ether functional groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerized a monomer which supplies the needed reactive functional group into the polymer chain. Usually, this copolymerizable functional group-supplying monomer will be present in small amounts, that is, on the order of 25 weight percent or less, and typically, between about 1 and 20 weight percent of the monomer mass which is polymerized. Some non-limiting examples of these functional group supplying monomers include glycidyl acrylate, glycidyl methacrylate, allyl glycidyl ether, dimethylaminoethyl methacrylate, vinyl pyridine, tert-butylaminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$–$C_3$) alkyl acrylic ester or mixtures thereof, e.g., methyl acrylate, ethyl acrylate, methyl methacrylate, ethyl methacrylate, styrene, or mixtures thereof, in an amount ranging between about 75 parts by weight to about 99 parts by weight and, more typically, between about 80 parts by weight to about 97 parts by weight.

The above described acrylic based coating compositions are merely examples of some of the coating compositions suitable for use in the present invention. Other suitable coating compositions include aliphatic polyurethanes, silicones, melamine/polyols, vinyl acetates, cellulose derivatives, polyester, fluorocarbon polymers and the like. All of these are also known in the art and commercially available.

The form in which the coating compositions are generally applied to the polyester-carbonate article is as an organic solution. However, other forms, as known in the art, including aqueous solutions, emulsions and dispersions of the coating compositions are equally useful. Further, the methods by which the coating compositions containing the ultraviolet radiation absorbing compound is applied to the polyester-carbonate article are also well known in the art and include, for example, dipping, spraying and roll-coating and the like.

The ultraviolet stabilizing coating compositions may further contain light-stabilizers, such as hindered amines; quenchers; antioxidants; antistats; flow control additives; emulsifiers; pigments; dyes; fillers and the like.

It is also contemplated by the present invention to provide ultraviolet radiation stabilized polyester-carbonate articles which are both resistant to photo-yellowing as well as resistant to mar and abrasion and/or attack by chemical solvents. Such articles may be prepared by adhering a hard coat top coat composition directly to at least one surface of the polyester-carbonate substrate or, preferably, adhering on at least one surface thereof (i) an adhesion promoting primer layer containing a thermoset acrylic polymer or thermoplastic acrylic polymer, as described above, and (ii) disposing a hard coat top coat on said primer layer, wherein either the hard coat top coat or the primer layer or both contain a UV stabilizer compound. Preferred embodiments of this aspect of the present invention will utilize a UV stabilizer containing acrylic primer layer to enhance adhesion of the mar and abrasion resistance hard coat top coat to the underlying polyester-carbonate as well as to provide protection against ultraviolet radiation to the underlying substrate.

The hard coat top coating is preferably a silicone hard coat, which may or may not contain a UV absorber, provided that at least one of the layers, ie. the primer layer or hard coat, contain a UV absorber, as mentioned above. Where the silicone hard coat contains a UV-absorber, it is preferred that the UV-absorber by copolymerized therewith. Specifically, in the preparation of the silicone hard coat, as disclosed below, the UV-stabilizing organic compound is cohydrolyzed with the components used to prepare the silicone hard coat such that the UV stabilizing organic compound is chemically incorporated into the silicone hard coat whereby said UV stabilizing organic groups are attached to silicone by carbon-silicone bonds. Similar coating compositions in method for their production are disclosed in U.S. Pat. Nos. 4,373,060 and 4,373,061, incorporated herein by reference.

In the preferred mode of this aspect of the present invention, the top coat composition comprises a colloidal silica filled further curable organopolysiloxane composition which is disposed on the outer surface of the primer layer. Suitable colloidal silica filled further curable organopolysiloxane compositions are disclosed in U.S. Pat. Nos. 3,986,997, 4,027,073, 2,786,042, 4,277,287, 4,299,476, 4,309,319 and 4,373,061, all incorporated herein by reference.

In particular, one type of colloidal silica filled further curable organopolysiloxane composition useful as the top coat composition in the practice of the present invention is as described in U.S. Pat. Nos. 3,986,997 and 4,027,073 and comprises a dispersion of colloidal silica in a lower aliphatic alcohol-water solution of the partial condensate of a silanol having the formula

VIII wherein $R^6$ is selected from the group consisting of alkyl radicals containing from 1 to about 3 carbon atoms, the vinyl radical, the 3,3,3-trifluoropropyl radical, the gamma-glycidoxypropyl radical and the gamma-methacryloxypropyl radical, with at least 70 percent by weight of said silanol being $CH_3Si(OH)_3$. This composition generally contains from about 10 to about 50 percent by weight of solids, said solids consisting essentially of a mixture of from about 10 to about 70 percent by weight of colloidal silica and from about 30 to about 90 percent by weight of the partial condensate of a silanol. The partial condensate of a silanol, i.e., a siloxanol, is preferably obtained entirely from the condensation of $CH_3Si(OH)_3$, however, the partial condensate may also optionally be comprised of a major portion which is obtained from the condensation of $CH_3Si(OH)_3$ and a minor portion which is obtained from the condensation of monoethyltrisilanol, monopropyltrisilanol, monovinyltrisilanol, monogammamethacryloxypropyltrisilanol, monogamma-glycidoxypropyltrisilanol, or mixtures thereof. The composition further contains sufficient acid to provide a pH in the range of 3.0 to 8.0. The pH is maintained in this range in order to prevent premature gellation and increase the shelf life of the silica filled organopolysiloxane composition and to obtain the optimum properties in the cured coating obtained from this composition. Suitable acids include both organic and inorganic acids such as hydrochloric, chloroacetic, acetic, citric, benzoic, formic, propionic, maleic, oxalic, glycolic and the like. The acid can be added to either the silane, which hydrolyzes to form the silanol component of the composition, or the hydrosol prior to mixing the two components.

The trisilanol component of this composition is generated in situ by the addition of the corresponding trialkoxysilanes to aqueous dispersions of colloidal silica. Suitable trialkoxysilanes are those containing methoxy, ethoxy, propoxy, isopropoxy, and sec-butoxy substituents. Upon generation of the silanol in the acidic aqueous medium there is condensation of the hydroxyl substituents to form —Si—O—Si— bonding. The condensation is not complete, but rather the siloxane retains an appreciable quantity of silicon-bonded hydroxyl groups, thus rendering the organopolysiloxane polymer soluble in the water-alcohol solvent. This soluble partial condensate can be characterized as a siloxanol polymer having at least one silicon-bonded hydroxyl group per every three —SiO— units. During curing of the top coat composition, which has been applied as a thin layer onto the surface of the primer layer further condensation of the uncondensed silanol groups occurs resulting in the formation of a substantially fully condensed thermoset (cross-linked) colloidal silica filled organopolysiloxane.

The silica component of the top coat composition is present in the form of colloidal silica. Aqueous colloidal silica dispersions generally have a particle size in the range of from about 5 to about 150 millimicrons in diameter. These silica dispersions are prepared by methods well known in the art and are commercially available. It is preferred to use colloidal silica having a particle size in the range of from about 10 to about 30 millimicrons in diameter in order to obtain dispersions having a greater stability and to provide top coatings having superior optical properties.

The silica filled further curable organopolysiloxane top coat compositions are prepared by adding trialkoxysilanes to colloidal silica hydrosol and adjusting the pH to a range of between 3.0 and 8.0 by the addition of acid. As mentioned previously, the acid can be added to either the silane or the silica hydrosol before the two components are mixed. Alcohol is generated during the hydrolysis of the trialkoxy silanes to the trisilanols. Depending upon the percent solids desired in the final coating compositions, additional alcohol, water, or a water-miscible solvent can be added. Suitable alcohols are the lower aliphatic alcohols such as methanol, ethanol, isopropanol, tert-butanol, and mixtures thereof. Generally, the solvent system should contain from about 20 to about 75 weight percent alcohol to ensure solubility of the siloxanol formed by the condensation of the silanol. If desired, a minor amount of an additional water miscible polar solvent such as acetone, butyl cellosolve, and the like can be added to the water-alcohol solvent system. Generally, sufficient alcohol or water-alcohol solvent is added to give a composition containing from about 10 to about 50 percent by weight of solids, said solids generally comprising from about 10 to about 70 percent by weight of colloidal silica and from about 30 to about 90 percent by weight of the partial condensate of the silanol. The composition is allowed to age for a short period of time to ensure formation of the partial condensate of the silanol. This condensation occurs upon the generation of the silanol in the acidic aqueous medium through the hydroxyl groups to form —Si—O—Si— bonding. The condensation is not complete, resulting in a siloxane having an appreciable amount of silicon-bonded hydroxyl groups. This aged, colloidal silica filled further curable organopolysiloxane top coat compostion is then applied onto the primed polyester-carbonate surface by any of the commonly known methods such as dipping, spraying, flow-coating and the like. After the top coat composition has been applied onto the primed polyester-carbonate surface a substantial amount of the volatile solvents present in the top coat compostion are evaporated off by either air drying or mild heating. After evaporation of a substantial portion of the solvents from the top coat composition there is left on the surface of the primer layer a generally solid layer comprised of a colloidal silica filled further curable organopolysiloxane. Heat is then applied to this further curable organopolysiloxane to effectuate further condensation of the silanols and cross-linking of the polymer. The result is a colloidal silica filled thermoset organopolysiloxane top coat which is highly resistant to scratching, abrasion, marring, and organic solvents, and which is tenaciously and durably adhered, by means of the adhesion promoting primer layer, to the ultraviolet radiation stabilized polycarbonate surface. Generally, this top coat contains from about 10 to about 70 weight percent of colloidal silica and from about 30 to about 70 weight percent of organopolysiloxane.

The thickness of the cured top coat is generally dependent upon the method of application and upon the weight percent solids present in the top coat composition. In general, the higher the weight percent solids present in the top coat composition and/or the longer the application or residence time of the top coat composition on the primed polycarbonate surface, the greater the thickness of the cured top coat. Preferably the cured top coat has a thickness of from about 0.1 to about 0.7 mils, more preferably from about 0.15 to about 0.5 mils, and most preferably from about 0.2 to about 0.3 mils.

Finally, as mentioned above, the organic UV absorbers useful in the practice of the present invention may be copolymerized with the hydrolyzable components of the hard coat composition to provide a UV stabilizing hard coat.

DESCRIPTION OF THE PREFERRED EMBODIMENTS

In order to more fully and clearly illustrate the present invention, the following specific examples are presented. It is intended that the examples be considered as illustrative of the invention disclosed and claimed herein, rather than limiting theron.

SOLUTION A

A coating solution was prepared by dissolving 15 parts by weight of ELVACITE ®2009 (E. I. duPont de Nemours Co.), a medium molecular weight polymethyl methacrylate, in 85 parts by weight of a solvent system consisting of 10 weight % ethylene glycol diacetate in butoxyethanol.

SOLUTION B

A coating solution outside the scope of the present invention was prepared by dissolving 10 parts by weight CYASORB ®UV 3100, (benzylidene malonate-American Cyanamid Co.) in 90 parts by weight of coating Solution A above.

SOLUTION C

A coating solution outside the scope of the present invention was prepared by dissolving 10 parts by weight Uvinal ®N-539 (cyanoacrylate-GAF Corporation) in 90 parts by weight of coating Solution A.

SOLUTION D

A coating solution outside the scope of the present invention was prepared by dissolving 10 parts by weight phenyl salicylate in 90 parts by weight Solution A.

SOLUTION E

A coating solution embodying the present invention was prepared by dissolving 10 parts by weight CYASORB UV 531 (hydroxy-benzophenone—American Cyamamid Co.) in 90 parts by weight of Solution A.

SOLUTION F

A coating solution within the scope of the present invention was prepared by dissolving 10 parts by weight Cyasorb UV 5411 (benzotriazole—American Cyamamid Co.) in 90 parts by weight Solution A.

SOLUTION G

A coating solution within the scope of the present invention was prepared by dissolving 10 parts by weight Uvinal D-49 (2,2' dihydroxy 4,4' dimethoxy benzophenone) in 90 parts by weight Bee Chemical LS-123 (a solution of PMMA and Cyasorb UV 531 in a mixture of solvents) coating solution.

EXAMPLES 1-8

Solutions A-G, described above, were flow coated onto extruded 2×2×0.03" LEXAN ®3250 polyester-carbonate chips (General Electric Co.). After draining for less than 1 minute, the coated samples were heated at 125° C. for 15 minutes. The yellowness indices of an uncoated chip and of each of the coated samples was determined using a Gardner Model XL-20 colorimeter according to ASTM Method D-1925-Plastic Materials. All of the samples were placed on a rotating table 10" below an array of four General Electric RS sunlamps. The yellowness indices of the samples were measured at various intervals, and the changes in yellowness indices are shown in Table 1.

As is evident from Table 1, the application of a non-UV stabilized coating composition (Solution A) on a polyester-carbonate article provides an only minor amount of protection against ultraviolet radiation to the underlying polyester-carbonate substrate. Further, the addition of phenyl salicylate, benzilidene malonate, and cyanoacrylate UV absorbers in the coating composition (Solutions D, B and C, respectively) provides little or no additional UV stability to the underlying polyester-carbonate substrate than is demonstrated by the non UV stabilized coating composition (Solution A). Specifically, each of the aforementioned polyester-carbonate articles were noticably yellow within four hours, with the exception of the cyanoacrylate which was noticably yellow within 28 hours. However, as demonstrated by Solutions E and F, UV stabilizer containing coating compositions wherein the UV stabilizer is a benzophenone or benzotriazole, respectively, displayed superior UV stabilization, thus protecting the underlying polyester-carbonate substrate. Specifically, polyester-carbonate substrates coated with a polymethylmethacrylate coating compositions containing hydroxybenzophenone and benzotriazole UV absorbers manifested little if any yellowness after over 100 hours exposure.

Clearly the specificity and the unexpected UV absorbing powers of the benzophenones and benzotriazoles for polyester-carbonates is evident.

TABLE 1

| 5 Coating Solution | YI as Function of Exposure to RS Sunlamps | | | |
|---|---|---|---|---|
| | 4 hrs. | 28 hrs. | 52 hrs. | 100 hrs. |
| No coating | 6.1 | 10.1 | 11.5 | 13.0 |
| Solution A | 5.3 | 8.4 | 9.8 | 11.6 |
| Solution B | 4.7 | 10.3 | 11.5 | 13.0 |
| Solution C | 2.4 | 8.0 | 9.9 | 11.9 |
| Solution D | 5.2 | 8.2 | 9.4 | 11.2 |
| Solution E | 0.6 | 2.5 | 3.8 | 5.6 |
| Solution F | 0.2 | 1.2 | 2.0 | 3.3 |

Obviously, other modifications and variations of the present invention are possible in light of the above teachings. It is, therefore, to be understood that changes may be made in the particular embodiment of the invention described herein which are within the full intended scope of the invention as defined by the appended claims.

I claim:

1. An improved coated polyester-carbonate article exhibiting improved resistance to degradation by ultraviolet radiation comprising a polyester-carbonate substrate comprising at least two of the following four recurring units in the chain:

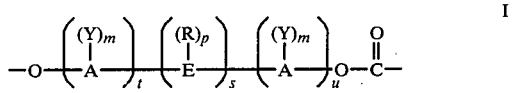

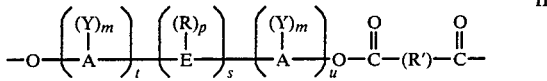

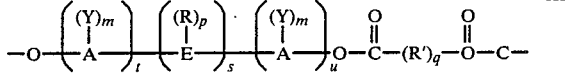

and

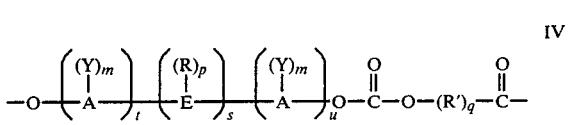

wherein

R is a monovalent hydrocarbon radical having inert substituents thereon, such that when more than one R is used, they may be alike or different;

E is selected from the group consisting of alkylene and alkylidene residues, ether radicals, sulfur-containing radicals, carbonyl radicals, tertiary nitrogen radicals, silicon-containing radicals, and two or more alkylene or alkylidene groups separated by the residue of an aromatic nucleus, tertiary amino radicals, ether radicals, carbonyl radicals, silane radicals, or sulfur-containing radicals;

A is the residue of an aromatic nucleus;

Y is a substituent selected from the group consisting of inorganic atoms, inorganic radicals and organic radicals, each member of the group being inert to and unaffected by the reactant and by the reaction conditions;

m is a whole number including zero to a maximum equivalent to the number of replaceable nuclear hydrogens substituted on the aromatic hydrocarbon residue;

p is a whole number including 0 to a maximum determined by the number of replaceable hydrogens on E;

s is 0 or 1;

t is a whole number including 0;

u is a whole number including 0, such that when s is 0, either t or u may be 0 and not both;

R' is selected from the group consisting of alkylenes, alkylidenes and cycloaliphatic groups in the same manner as set out for R; an alkylene, alkylidene or cycloaliphatic group containing ethylenic unsaturation; aromatic radicals; two or more aromatic groups connected through non-aromatic linkages; and alkyl radicals; and q is 0 or 1, said substrate having durably adhered thereon a coating composition wherein the improvement consists essentially of said coating having contained therein a UV absorber selected from the group consisting essentially of benzophenones and derivatives thereof and benzotriazoles and derivaties thereof.

2. The improved article of claim 1 wherein the UV absorber is present in the coating composition in an amount sufficient to effectively stabilize the underlying polyester-carbonate substrate against degradation by ultraviolet light.

3. The improved article of claim 1 wherein the UV absorber is a benzophenone or derivative thereof.

4. The improved article of claim 3 wherein the UV absorber is an hydroxybenzophonone.

5. The improved article of claim 1 wherein the UV absorber is a benzotriazole or derivative thereof.

6. The improved article of claim 5 wherein the UV absorber is a benzotriazole of the formula:

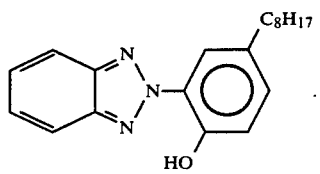

7. The improved article of claim 1 wherein the coating composition is selected from the group consisting essentially of thermoplastic acrylics, thermoset acrylics, aliphatic polyurethanes, silicones, melamines/polyols, vinyl acetates, cellulose derivatives, polyesters, fluorocarbon polymers and the like.

8. The improved article of claim 7 wherein the coating composition is polymethylmethacrylate.

9. The improved article of claim 7 wherein the coating composition is a silicone coating composition comprising a colloidal silica filled further curable organopolysiloxane.

10. The article of claim 9 wherein the UV absorber is copolymerized with the colloidal silica filled further curable organopolysiloxane hard coat composition.

11. An improved coated polyester-carbonate article exhibiting improved resistance to degradation by ultraviolet radiation comprising a polyester-carbonate resin substrate comprising at least two of the following four recurring units in the chain:

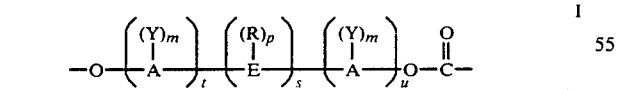  I

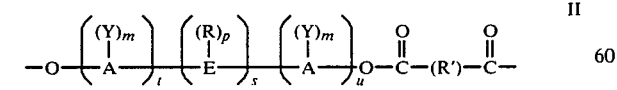  II

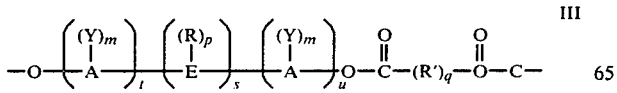  III and

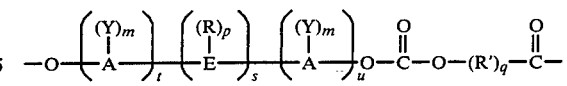  IV wherein

R is a monovalent hydrocarbon radical having inert substituents thereon, such that when more than one R is used, they may be alike or different;

E is selected from the group consisting of alkylene and alkylidene residues, ether radicals, sulfur-containing radicals, carbonyl radicals, tertiary nitrogen radicals, silicon-containing radicals, and two or more alkylene or alkylidene groups separated by the residue of an aromatic nucleus, tertiary amino radicals, ether radicals, carbonyl radicals, silane radicals, or sulfur-containing radicals;

A is the residue of an aromatic nucleus;

Y is a substituent selected from the group consisting of inorganic atoms, inorganic radicals and organic radicals, each member of the group being inert to and unaffected by the reactant and by the reaction conditions;

m is a whole number including zero to a maximum equivalent to the number of replaceable nuclear hydrogens substituted on the aromatic hydrocarbon residue;

p is a whole number including 0 to a maximum determined by the number of replaceable hydrogens on E;

S is 0 or 1;

t is a whole number including 0;

u is a whole number including 0, such that when s is 0, either t or u may be 0 and not both;

R' is selected from the group consisting of alkylenes, alkylidenes and cycloaliphatic groups in the same manner as set out for R; an alkylene, alkylidene or cycloaliphatic group containing ethylenic unsaturation; aromatic radicals; two or more aromatic groups connected through non-aromatic linkages; and alkyl radicals; and q is 0 or 1, said resin substrate having durably adhered to at least one surface thereof a coating comprised of (i) an adhesion promoting primer layer containing a thermoplastic acrylic polymer or thermoset acrylic polymer disposed on said surface, and (ii) adherently disposed on said primer layer a top coat layer containing a colloidal silica filled thermoset organopolysilioxane, the improvement consisting essentially of the primer layer and/or the top coat layer containing at least one ultraviolet radiation absorbing compound selected from the group consisting essentially of benzotriazoles and derivatives thereof and benzophenones and derivatives thereof.

12. The article of claim 11 wherein the UV absorber is present in an amount sufficient to effectively stabilize the underlying polyester-carbonate substrate against degradation by ultraviolet light.

13. The article of claim 11 wherein the UV absorber is present in the primer layer.

14. The article of claim 11 wherein the UV absorber is contained in both the primer layer and the top coat.

15. The article of claim 14 wherein the UV absorber contained in the top coat layer is copolymerized therewith.

16. A method for stabilizing polyester-carbonate articles against degradation due to ultraviolet radiation, said polyester-carbonate articles comprising a polyester-carbonate substrate comprising at least two of the following four recurring units in the chain:

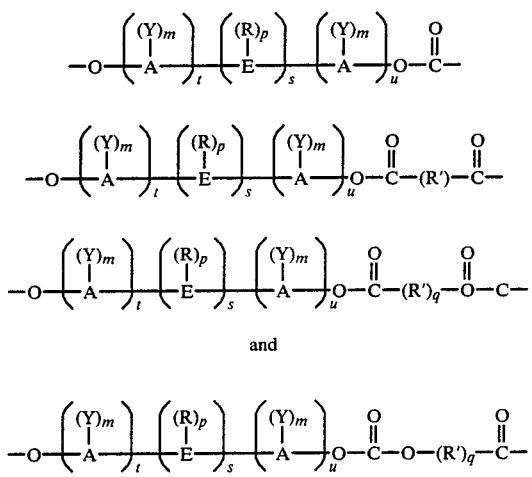

and wherein
- R is a monovalent hydrocarbon radical having inert substituents thereon, such that when more than one R is used, they may be alike or different;
- E is selected from the group consisting of alkylene and alkylidene residues, ether radicals, sulfur-containing radicals, carbonyl radicals, tertiary nitrogen radicals, silicon-containing radicals, and two or more alkylene or alkylidene groups separated by the residue of an aromatic nucleus, tertiary amino radicals, ether radicals, carbonyl radicals, silane radicals, or sulfur-containing radicals;
- A is the residue of an aromatic nucleus;
- Y is a substituent selected from the group consisting of inorganic atoms, inorganic radicals and organic radicals, each member of the group being inert to and unaffected by the reactant and by the reaction conditions;
- m is a whole number including zero to a maximum equivalent to the number of replaceable nuclear hydrogens substituted on the aromatic hydrocarbon residue;
- p is a whole number including 0 to a maximum determined by the number of replaceable hydrogens on E;
- s is 0 or 1;
- t is a whole number including 0;
- u is a whole number including 0, such that when s is 0, either t or u may be 0 and not both;
- R' is selected from the group consisting of alkylenes, alkylidenes and cycloaliphatic groups in the same manner as set out for R; an alkylene, alkylidene or cycloaliphatic group containing ethylenic unsaturation; aromatic radicals; two or more aromatic groups connected through non-aromatic linkages; and alkyl radicals; and
- q is 0 or 1, said method comprising adhering on at least one surface of the polyester-carbonate substrate a coating composition containing a UV absorber selected from the group consisting essentially of benzophenones and derivatives thereof and benzotriazoles and derivatives thereof.

17. The method of claim 16 wherein the coating composition is selected from the group consisting essentially of thermoplastic acrylics, thermoset acrylics, aliphatic polyurethanes, silicones, melamines/polyols, vinyl acetates, cellulose derivatives, polyesters, fluorocarbon polymers and the like.

18. The article of claim 17 wherein the coating composition is polymethylmethacrylate.

19. The article of claim 17 wherein the silicone coating composition is a colloidal silica filled further curable organopolysiloxane.

20. The article of claim 16 wherein the UV absorber is present in an amount sufficient to effectively stabilize the underlying polyester-carbonate substrate against degradation by ultraviolet light.

21. A method for stabilizing a polyester-carbonate article against degradative effects of ultraviolet radiation, said polyester-carbonate articles comprising a polyester-carbonate substrate comprising at least two of the following four recurring units in the chain:

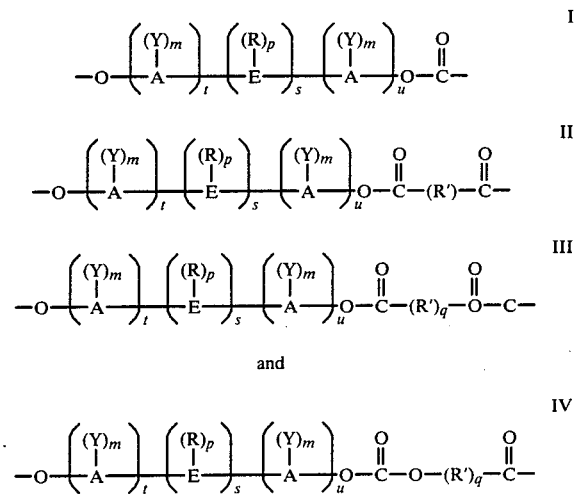

and wherein
- R is a monovalent hydrocarbon radical having inert substituents thereon, such that when more than one R is used, they may be alike or different;
- E is selected from the group consisting of alkylene and alkylidene residues, ether radicals, sulfur-containing radicals, carbonyl radicals, tertiary nitrogen radicals, silicon-containing radicals, and two or more alkylene or alkylidene groups separated by the residue of an aromatic nucleus, tertiary amino radicals, ether radicals, carbonyl radicals, silane radicals, or sulfur-containing radicals;
- A is the residue of an aromatic nucleus;
- Y is a substituent selected from the group consisting of inorganic atoms, inorganic radicals and organic radicals, each member of the group being inert to and unaffected by the reactant and by the reaction conditions;
- m is a whole number including zero to a maximum equivalent to the number of replaceable nuclear hydrogens substituted on the aromatic hydrocarbon residue;

p is a whole number including 0 to a maximum determined by the number of replaceable hydrogens on E;

s is 0 or 1;

t is a whole number including 0;

u is a whole number including 0, such that when s is 0, either t or u may be 0 and not both;

R' is selected from the group consisting of alkylenes, alkylidenes and cycloaliphatic groups in the same manner as set out for R; an alkylene, alkylidene or cycloaliphatic group containing ethylenic unsaturation; aromatic radicals; two or more aromatic groups connected through non-aromatic linkages; and alkyl radicals; and q is 0 or 1, said method comprising adhering to at least one surface thereof a coating comprised of (i) an adhesion promoting primer layer containing a thermoplastic acrylic polymer of thermoset acrylic polymer disposed on said surface and (ii) adherently disposing on said primer layer a top coat layer containing a colloidal silica filled thermoset organopolysiloxane wherein the primer layer and/or the top coat layer contained at least one ultraviolet radiation absorbing compound selected from the group consisting essentially of benzotriazoles and derivatives thereof and benzophenones and derivatives thereof.

22. The method of claim 21 wherein the UV absorber is present in an amount sufficient to effectively stabilize the underlying polyester-carbonate substrate against degradation by ultraviolet light.

* * * * *